United States Patent [19]
Cioara

[11] Patent Number: 5,674,380
[45] Date of Patent: Oct. 7, 1997

[54] OIL FILTER AND FILTER BLOCKAGE ALARMING SYSTEM

[76] Inventor: Matei Cioara, 1739 Moffet St., Apt. #3, Hollywood, Fla. 33020

[21] Appl. No.: 517,619

[22] Filed: Aug. 22, 1995

[51] Int. Cl.$^6$ .................................................. B01D 35/143
[52] U.S. Cl. ........................ 210/85; 123/196 A; 210/90; 210/168
[58] Field of Search ........................ 210/85, 90, 130–133, 210/168, DIG. 17; 116/DIG. 42; 200/81.9 R, 82 E; 184/108; 123/196 A; 73/745; 55/274

[56] References Cited

U.S. PATENT DOCUMENTS

| | | | |
|---|---|---|---|
| 2,879,892 | 3/1959 | Frakes | 210/90 |
| 3,045,826 | 7/1962 | Howard et al. | 116/DIG. 42 |
| 4,626,344 | 12/1986 | Fick et al. | 210/90 |
| 4,885,082 | 12/1989 | Cantoni | 210/90 |

FOREIGN PATENT DOCUMENTS

| | | |
|---|---|---|
| 54645 | 10/1972 | Romania . |
| 89313 | 3/1980 | Romania . |
| 80578 | 5/1983 | Romania . |
| 88502 | 4/1986 | Romania . |
| 105024 | 4/1995 | Romania . |

*Primary Examiner*—Joseph W. Drodge
*Attorney, Agent, or Firm*—Herbert L. Lerner; Laurence A. Greenberg

[57] ABSTRACT

A lubricating oil filter and filter blockage alarm system for internal combustion engines. At least one filter element is disposed within a housing. A condition representing a degree of blockage of the filter element is sensed and, if a blockage threshold is exceeded, an alarm is triggered. There is provided an electrical connection between the sensor and the alarm system. The connection is a pair of series-connected platinum conductors that are insulated from contact with the oil being filtered, thereby assuring the triggering of the alarm.

1 Claim, 3 Drawing Sheets

5,674,380

OIL FILTER AND FILTER BLOCKAGE ALARMING SYSTEM

BACKGROUND OF THE INVENTION

1. Field of the Invention

The invention relates to oil filters for internal combustion engines including automotive, boating, and airplane engines and, more specifically, to oil filters with blockage indication.

2. Description of the Related Art

Oil filters which are currently in use, such as oil filters manufactured by Fram, Saviem, Bosch or Loked, are conventionally enclosed in a metallic casing and they have a filtration circuit with an hydraulic valve. Most of the prior art filters cannot be recycled after use and they are usually discarded and exchanged for new filters.

An oil filter with a blockage signal switch is known, for example, from Romanian patent No. RO 105024, which was published in April 1995. The oil filter is provided with a mechanical sensor which detects a situation in which the filter orifices are clogged by dirt particles in the oil and the unfiltered oil is circulated through the engine.

The prior art oil filters have several disadvantages: In the Romanian patent RO 105024, for instance, the hydraulic sensing valve is disposed at the cap of the filter element, so that the filtration surface (the exposed surface of the filter) is reduced. The electrical switch used in the system may become inoperable because of the high temperatures of the engine oil. Finally the structure is quite complicated, difficult to manufacture and thus expensive and it has been found to have a tendency to leak.

Similar filters of the above kind are found in U.S. Pat. No. 4,626,344 and Romanian patents 88502, 54645, and 89313.

Oil filters are usually replaced within a certain amount of operating time of the engine. There is often no indication as to the degree of clogging of the oil filter. Different blockage indicators are known in industrial settings and some are known in the context of internal combustion engines. Such indicators are usually complicated and their function is defined in the interior of the lubrication system, and often their functioning cannot be controlled.

SUMMARY OF THE INVENTION

It is accordingly an object of the invention to provide an oil filter for an internal combustion engine with a blockage alarm system, which overcomes the above-mentioned disadvantages of the prior art devices of this general type and which enable easy and inexpensive manufacture, which provide a maximum filtration surface. The object is also to improve the quality of oil filtration and to simplify the alarm system of filters.

With the foregoing and other objects in view there is provided, in accordance with the invention, a lubricating oil filter and filter blockage alarm system for internal combustion engines, comprising:

a housing;

at least one filter element disposed within the housing;

means for sensing a condition representing a degree of blockage of the at least one filter element;

means for alarming responsive to the means for sensing; and means for providing electrical connection between the means for sensing and means for alarming including a pair of series-connected platinum conductors that are insulated from contact with the oil being filtered, thereby assuring functioning of the means for alarming.

In addition, the available filtration surface is greatly increased in that the location of the hydraulic valve is changed as compared to the prior art; the hydraulic valve is disposed at the middle of the cap and it aids in tightening the oil filter.

The novel oil filter may be manufactured from recycled materials and it does not require mechanical processes as do many prior art filters.

The novel filter exhibits superior filtering capacity. Furthermore, the filter may be disassembled into various components and it has a superior life-expectancy when it is cleaned and the filtration element is exchanged.

In order to assure dependable functionality of the alarm system, the novel system replaces the prior art electrical switch which causes problems because of the oil temperature with a copper wire 3–4 mm in gauge, fixed by spot welding or the like in the middle of the disk. A wire cap is provided with a platinum contact soldered thereon.

Other features which are considered as characteristic for the invention are set forth in the appended claims.

Although the invention is illustrated and described herein as embodied in an oil filter with blockage alarm system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
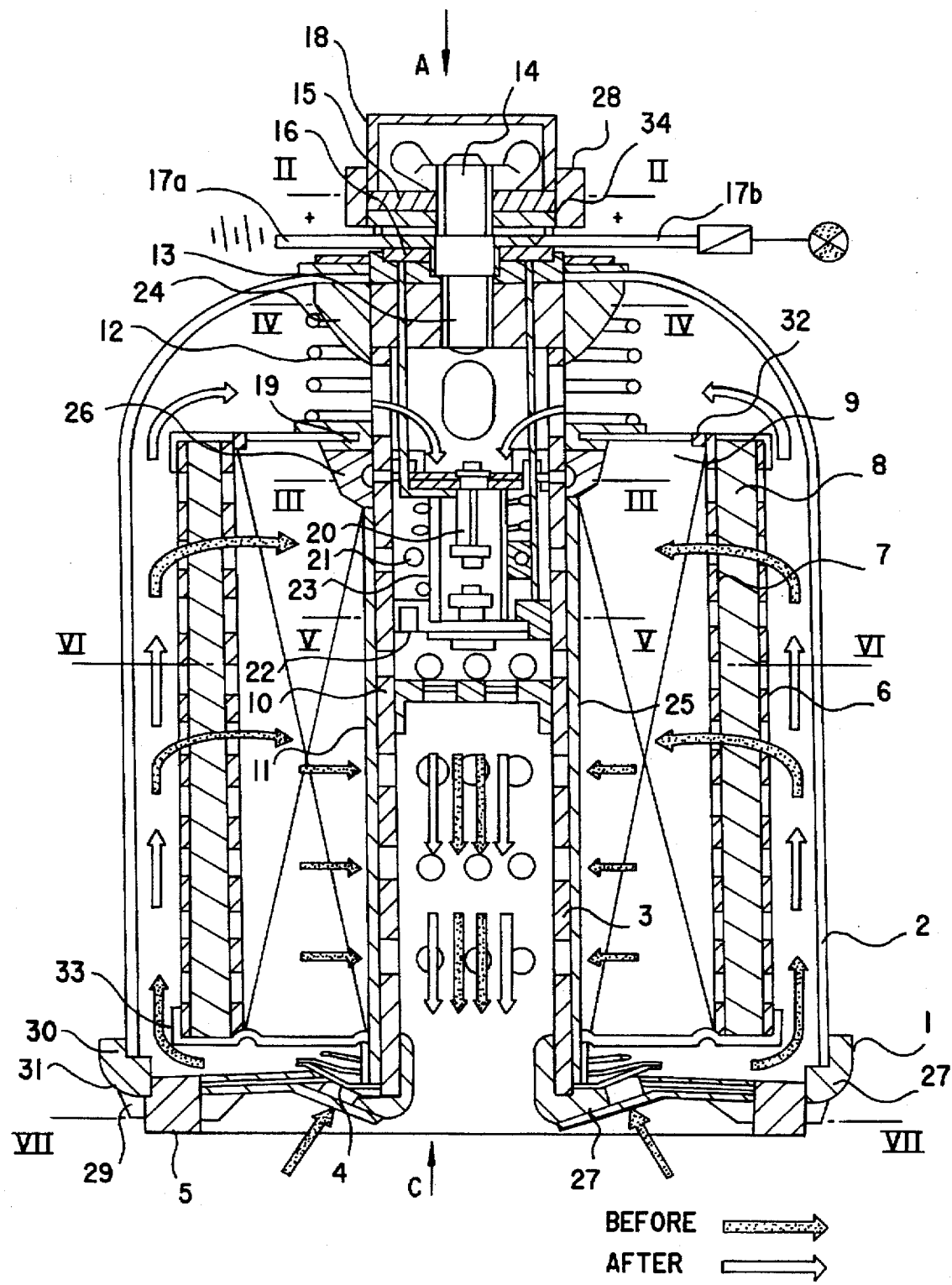
FIG. 1 is an axial section through the oil filter according to the invent.

Referring now to the figures of the drawing in detail and first, particularly, to FIG. 1 thereof, there is seen a housing of the oil filter formed of a main part 1 and a casing 2. The main part 1 is formed of galvanized sheet metal having a thickness of 2.5 mm. The part 1 is formed with eight concentrically distributed holes of 6 mm diameter, through which the oil arriving from the oil pump enters the oil filter assembly. The oil filter assembly is conventionally mounted on the engine by screwing the filter onto an appropriate fitting on the engine (using tape sealant). The filter is threaded for that purpose at the main center opening. The filter casing 2 encloses the filter assembly. The casing 2 is formed from galvanized sheet metal having a thickness of 1 mm. The casing 2 is attached to the main part 1 via a ring 30 and a gasket 31.

A central tightening tube 3, formed of 1.5 mm thick metal sheet, is welded to the main part 1. An anti-backlash fixture 4 formed of buna gasket is placed inside the filter assembly and over the eight holes in the main part 1. A washer of 0.3 mm thickness is placed over the gasket which is held in place by a steel wire spring (1 mm wire) with four coils.

Figure 7:
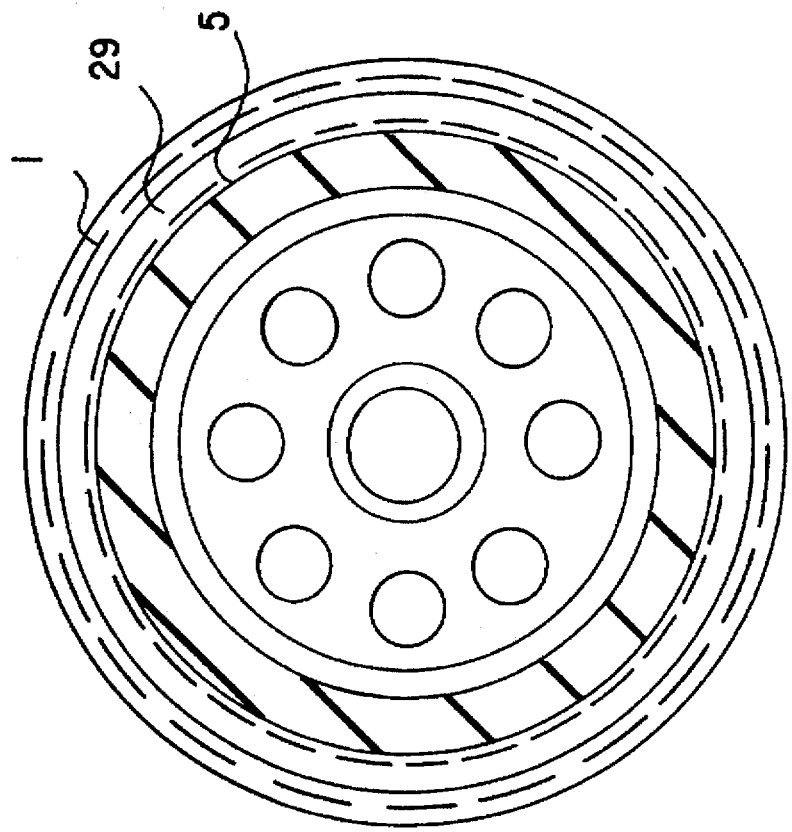
FIG. 7 is a cross-sectional view taken along the line VII—VII of FIG. 1.

A rubber gasket 5 forms the necessary seal between the housing 1, 2 of the filter and the engine. The rubber gasket 5 is attached with sheet metal 29 of about 0.3 mm thickness (see FIGS. 1 and 7).

The Filtration System

A perforated exterior tube 6 forms the radially outermost member of the filtration system. The tube 6 is formed of sheet metal of 0.3 mm thickness. A perforated inner tube 7 is made from pressed carton of about 0.3 mm thickness. Filter material 8 of recycled cotton is placed between the exterior tube 6 and the interior tube 7.

The space between the interior tube 7 and the central tube 3 is provided with material of first stage fine filtering for full flow. A strain filter 10 is placed on the central tube 3. The strain filter is a plastic or metal strainer with the following granularity: $1100/cm^2$ and $1500/cm^2$ (holes per square cm).

Figure 6:
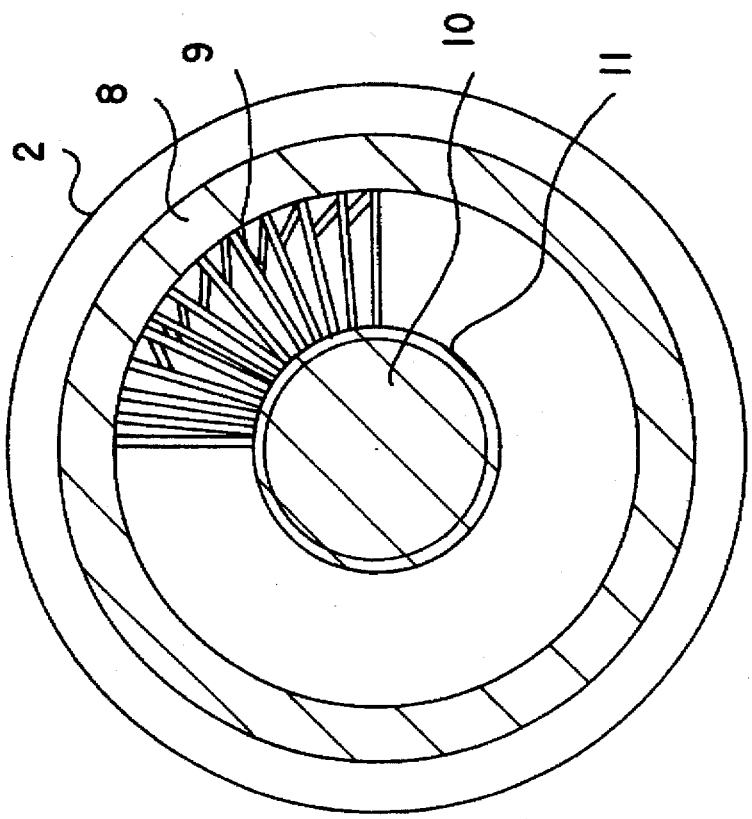
FIG. 6 is a cross-sectional view taken along the line VI—VI of FIG. 1.

With reference to FIG. 6, within the central tube 3 there is disposed a supplemental filter 11 formed of round metal sheet (approx. 0.3 mm) with a plurality of concentric holes formed therein. The supplemental filter 11 is secured by screws 25. Two filter stages are disposed on top of the supplemental filter (upstream as seen in the oil flow direction) which are made of plastic with different granularity (same as above).

A steel wire spring 12 (diameter of 1–3 mm) biases the filter assembly downwardly against the main part 1 during manual tightening.

The Tightening System

A tightening member 13 is formed of OL 50. The member 50 is formed with two through openings of 2 mm diameter through which copper conductors are guided. The tightening member 13 is affixed at the upper end of the central tightening tube 3 and it is formed with a threaded center hole M8x1 pass.

Figure 2:
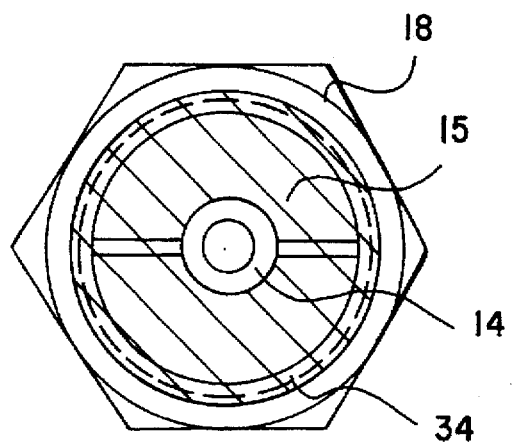
FIG. 2 is a cross-sectional view taken along the line II—II of FIG. 1.

A butterfly head screw 14 allows manual tightening of the system. A washer 15 is placed below the head screw 14. A buna gasket 16 is formed with two side holes of 2 mm diameter through which isolated copper conductors 17a, 17b. The copper conductors 17 are 1.5 mm gauge conductors. A protective cap 18 of plastic material encloses the butterfly nut 14. See FIG. 2 for a cross-sectional view of the tightening system.

The Blockage Sensor

Figure 3:
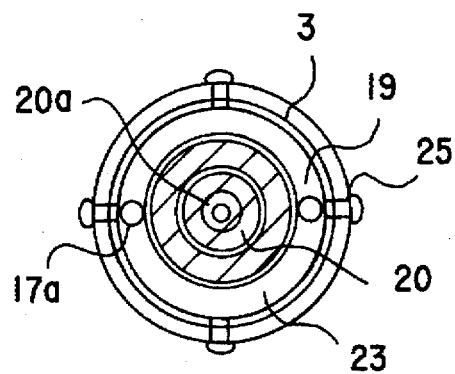
FIG. 3 is a cross-sectional view taken along the line III—III of FIG. 1.
Figure 4:
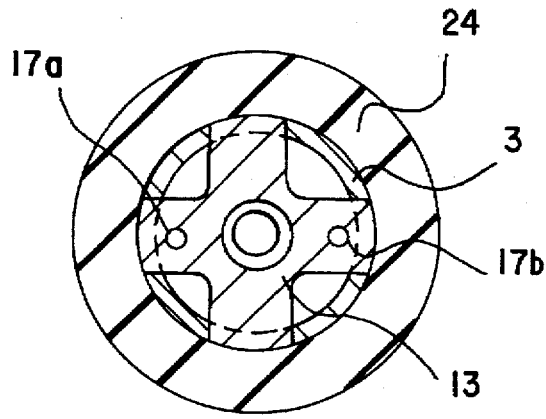
FIG. 4 is a cross-sectional view taken along the line IV—IV of FIG. 1.
Figure 5:
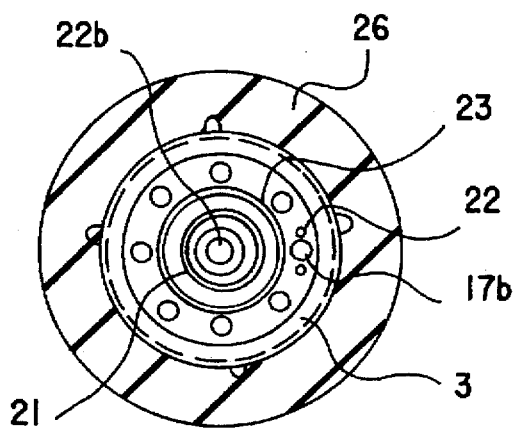
FIG. 5 is a cross-sectional view taken along the line V—V of FIG. 1.

An upper support 19 is disposed inside the central tube 3 on which a ball bearing rests. A 3 mm gauge copper wire 20 is provided with a soldered platinum contact 20a (see FIG. 3). A steel wire spring of 1.3 mm thickness provides the contact bias. A spring support 22 is disposed inside the central tube 3. A platinum contact 22b (FIG. 5) is soldered centrally on the spring support 22. The spring support 22 and the upper support 19 together enclose the space for the spring 21 and the sensor switch.

A plastic tube 23 of gage 10 mm, protects the sensor switch between the contacts. A simmering buna gasket 24 is provided so as to safely enclose the filtering system. Several screws or rivets are distributed about the central tube to hold the supports 22 and 19 in place. The bolts or rivets can also be replaced by spot welding.

A buna gasket 26 allows proper tightening of the filtration system. Reference numeral 27 also pertains to a buna gasket. Reference numeral 28 illustrates a rubber attachment below the washer 15.

A sheet metal ring 30 allows proper mounting of the casing on the main part and the rubber gasket 29 formed of sheet metal with a thickness of 0.3 mm provides the necessary seal.

Reference numeral 32 pertains to an upper cap of the main filter system and reference numeral 33 pertains to a lower cap of the main filter system. Reference numeral 34 pertains to threaded bushings OL 38 in which is screwed the cap 18.

The Function of the Filter

The oil pump forces the oil through the eighth holes in the main part 1 at an average pressure of 0.4 $kg/cm^2$. The thus pressurized oil is pushed into the first filtering substrate 8, and from their the oil enters into the second stage into the fine filtering stage 9 which is made from micropaper of the type full flow. After the fine filtration, the oil enters into the filter surrounding the central tube and then exits through the openings formed in the central tube. The openings in the central tube are approximately 3 mm in diameter. At that point, the oil enters the engine so as to lubricate the bearings. The oil filter forms a part in the regular oil filtering and lubrication loop. The oil cycle is repeated until the oil carries more and more impurities. During the clogging in the filter, the static pressure reaches up to 0.9 $kg/cm^2$. The degree of blockage of the oil filter during its use is indirectly proportional with the filtration surface which is available. The greater the filtration surface, the higher the life span of the oil filter.

The voltage necessary to operate the system is furnished by the regular onboard power, such as by a battery of 6 or 12 V. A conductor a is connected at the anode of the battery. The conductor a is guided through one of the simmering holes 16 and it continues through one of the holes formed in the tightening member 13. Then it continues to the platinum contact which is soldered to the conductor.

A second conductor b, which is not attached to the battery, follows a similar path, but through the respectively other simmering holes at 16 and at 13. The conductor b is soldered to the platinum contact which is fixed on the spring support 22 and at the end of 21.

The two platinum contacts face one another with a mutual spacing of approximately 4 to 5 mm. As noted in the foregoing, they are protected from the flowing oil by the plastic tube 23 of approximately 8–10 mm in gage.

The platinum contacts remain open until the pressure in the oil reaches 0.9 $kg/cm^2$. At that point the steel spring 21 is no longer able to oppose the oil pressure from above and the platinum contacts are closed in that upper platinum contact comes into contact with the lower platinum contact. At that point, current is allowed to flow through the contacts and from the conductor a (the battery positive terminal) to the conductor b, which is connected to a relay and to a signaling lamp. At that time, the signaling lamp indicates that the filter is blocked.

I claim:

1. A lubricating oil filter and filter blockage alarm system for internal combustion engines, comprising:

a housing;

at least one filter element disposed within the housing;

means for sensing a condition representing a degree of blockage of the at least one filter element;

means for alarming responsive to the means for sensing; and means for providing electrical connection between the means for sensing and means for alarming including a pair of series-connected platinum conductors that are insulated from contact with the oil being filtered, thereby assuring functioning of the means for alarming.

* * * * *